United States Patent
Mettrick et al.

(10) Patent No.: US 10,266,028 B2
(45) Date of Patent: Apr. 23, 2019

(54) SUSPENSION SYSTEM AND METHOD OF CONTROL

(71) Applicant: GM Global Technology Operations LLC, Detroit, MI (US)

(72) Inventors: Christopher J. Mettrick, Whitby (CA); Chris Morgan, Ann Arbor, MI (US); Christopher Archambo, Livonia, MI (US); Aditya Muktidoot, Beverly Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 53 days.

(21) Appl. No.: 15/495,247

(22) Filed: Apr. 24, 2017

(65) Prior Publication Data

US 2018/0304717 A1    Oct. 25, 2018

(51) Int. Cl.
*B60G 17/033* (2006.01)
*B60G 11/27* (2006.01)
*B60G 17/016* (2006.01)

(52) U.S. Cl.
CPC ............ *B60G 17/033* (2013.01); *B60G 11/27* (2013.01); *B60G 17/0162* (2013.01); *B60G 17/0163* (2013.01); *B60G 2400/10* (2013.01); *B60G 2400/25* (2013.01); *B60G 2400/41* (2013.01); *B60G 2400/51222* (2013.01); *B60G 2500/20* (2013.01); *B60G 2500/201* (2013.01); *B60G 2500/30* (2013.01); *B60G 2800/18* (2013.01); *B60G 2800/24* (2013.01)

(58) Field of Classification Search
CPC ............ B60G 17/0525; B60G 17/0408; B60G 2202/152; B60G 2202/42; B60G 2500/30; B60G 2600/20
See application file for complete search history.

(56) References Cited

U.S. PATENT DOCUMENTS

| | | | |
|---|---|---|---|
| 9,050,871 B2 | 6/2015 | Li et al. | |
| 2010/0032912 A1* | 2/2010 | Inoue | B60G 11/27 280/5.502 |
| 2010/0036561 A1* | 2/2010 | Jung | B60G 17/0195 701/37 |
| 2016/0031287 A1* | 2/2016 | Guest | B60G 17/0165 701/37 |
| 2016/0195151 A1* | 7/2016 | Prams | B60G 17/019 267/64.27 |
| 2016/0272035 A1* | 9/2016 | Oishi | B60G 17/0525 |

* cited by examiner

*Primary Examiner* — Yonel Beaulieu
*Assistant Examiner* — Martin A Weeks
(74) *Attorney, Agent, or Firm* — Cantor Colburn LLP

(57) ABSTRACT

A suspension system for a vehicle includes a plurality of air spring assemblies, each having an air spring, and a suspension position sensor; and a controller. The controller is programmed to determine corner forces associated with each air spring of the plurality of air spring assemblies based on a pressure provided by a pressure sensor and an effective area of each air spring of the plurality of air spring assemblies based on a total length provided by the suspension position sensor, according to a target total length of each air spring.

19 Claims, 2 Drawing Sheets

SUSPENSION SYSTEM AND METHOD OF CONTROL

INTRODUCTION

The subject disclosure relates to a suspension system and a method of control of the suspension system.

Vehicles may be provided with air suspensions that utilize air springs to provide control of ride height as well as ride comfort and vehicle performance. The air springs may include an airbag that receives pressurized air to change a spring rate of the air suspension. The pressure within the airbag may be selectively controlled to provide variable spring rates and ride heights.

Accordingly, it is desirable to actively control and adjust spring rates and ride heights of the air spring.

SUMMARY

In one illustrative embodiment a suspension system is provided. The suspension system includes a plurality of air spring assemblies and a controller. The plurality of air spring assemblies each include an air spring, a pressure sensor to monitor a pressure of the air spring, and a suspension position sensor to monitor a total length of the air spring. The controller is in communication with each air spring assembly. The controller is programmed to determine an estimated total length of the air spring based on the pressure of the air spring and a plurality of air spring characteristics.

In addition to one or more of the features described herein, the controller is further programmed to vary an air mass of at least one air spring of the plurality of air spring assemblies, in response to an average difference between the total length of the air spring and the estimated total length of the air spring being greater than a threshold.

In addition to one or more of the features described herein, the controller is further programmed to receive the pressure of the air spring from the pressure sensor, in response to the estimated total length being different from a target total length of the air spring.

In addition to one or more of the features described herein, the controller is further programmed to determine corner forces associated with each air spring of the plurality of air spring assemblies based on the pressure and an effective area of the air spring.

In addition to one or more of the features described herein, the corner forces associated with each of the plurality of air spring assemblies is further based on at least one of a steering angle, an aerodynamic force, and a vehicle acceleration.

In addition to one or more of the features described herein, the controller is further programmed to determine a vehicle cross percentage based on the corner forces.

In addition to one or more of the features described herein, the controller is further programmed to vary the air mass of at least one air spring of the plurality of air spring assemblies, in response to an average difference between the vehicle cross percentage and a predetermined vehicle cross percentage being greater than a vehicle cross percentage threshold.

In another illustrative embodiment a suspension system for a vehicle is provided. The suspension system includes a plurality of air spring assemblies, each having an air spring, and a suspension position sensor; and a controller. The controller is programmed to determine corner forces associated with each air spring of the plurality of air spring assemblies based on a pressure provided by a pressure sensor and an effective area of each air spring of the plurality of air spring assemblies based on a total length provided by the suspension position sensor, according to a target total length of each air spring.

In addition to one or more of the features described herein, the controller is further programmed to determine a total vehicle weight and to determine a vehicle cross percentage based on the corner forces of each air spring of the plurality of air spring assemblies.

In addition to one or more of the features described herein, the controller is further programmed to determine a target corner force associated with each air spring of the plurality of air spring assemblies according to the target total length, based on the vehicle weight and the vehicle cross percentage.

In addition to one or more of the features described herein, the controller is further programmed to, in response to an average difference between the vehicle cross percentage and a predetermined vehicle cross percentage according to the target total length of each air spring being greater than a threshold, determine an estimated total length of each air spring of the plurality of air spring assemblies.

In addition to one or more of the features described herein, the controller is further programmed to in response to an estimated total length of at least one air spring being different from a target total length of the at least one air spring, receive a pressure and the total length of each air spring of the plurality of air spring assemblies.

In addition to one or more of the features described herein, the estimated total length of each air spring of the plurality of air spring assemblies is based on the pressure and a predetermined air spring characteristic of each air spring.

In addition to one or more of the features described herein, the controller is further programmed to in response on an average difference between the total length of at least one air spring of the plurality of air spring assemblies and the estimated total length of at least one air spring of the plurality of air spring assemblies being greater than a total length threshold, vary an air mass of at least one air spring of the plurality of air spring assemblies.

In yet another illustrative embodiment a method of controlling a suspension system is provided. The method receives a pressure and a total length of each air spring of a plurality of air spring assemblies, in response to an estimated total length of at least one air spring being different from a target total length of at least one air spring. The method determines corner forces associated with each air spring of the plurality of air spring assemblies based on the pressure and an effective area of each air spring of the plurality of air spring assemblies.

In addition to one or more of the features described herein, the estimated total length is based on the pressure and a plurality of air spring characteristics of each air spring.

In addition to one or more of the features described herein, the method determines a vehicle cross percentage based on the corner forces of each air spring of the plurality of air spring assemblies.

In addition to one or more of the features described herein, the vehicle cross percentage is further based on at least one of an aerodynamic force, a vehicle acceleration, and a steering angle.

In addition to one or more of the features described herein, the method assigns a priority of adjustment to at least one air spring of the plurality of air spring assemblies.

In addition to one or more of the features described herein, the method varies an air mass of at least one air spring of the plurality of air spring assemblies according to the assigned priority of adjustment.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
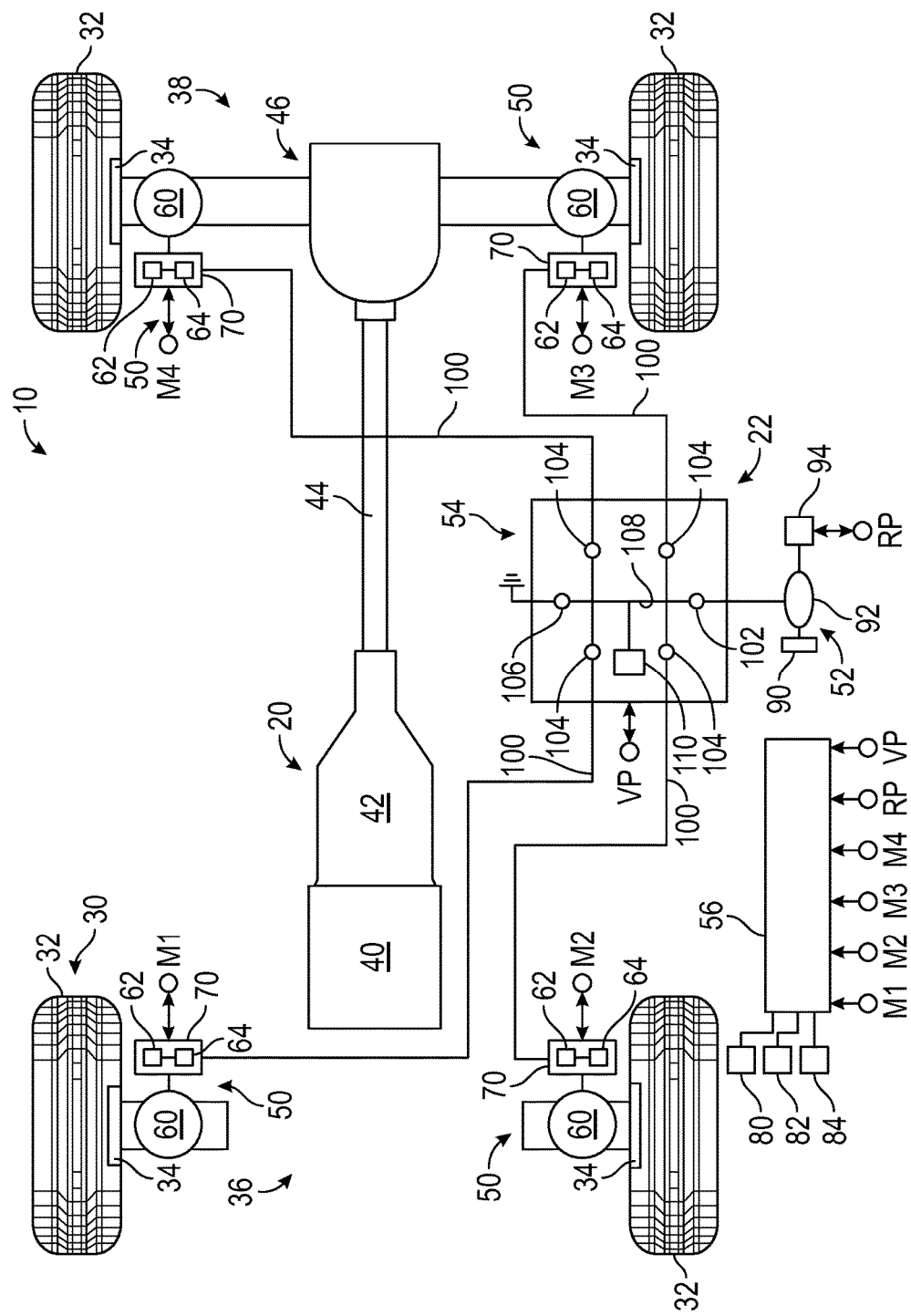
FIG. 1 is a schematic of a vehicle having a suspension system.

The following description is merely exemplary in nature and is not intended to limit the present disclosure, its application or uses. It should be understood that throughout the drawings, corresponding reference numerals indicate like or corresponding parts and features.

Referring to FIG. 1, in accordance with an illustrative embodiment, a vehicle 10 is shown. The vehicle 10 may be a motor vehicle such as a track capable vehicle, a truck, a bus, farm equipment, a military transport vehicle, or other vehicle. The vehicle may include a powertrain 20 and a suspension system 22.

The powertrain 20 provides torque to one or more wheel assemblies 30 to propel the vehicle 10. Each wheel assembly of the plurality of wheel assemblies 30 may include at least one tire 32 mounted on a wheel 34. A pair of the one or more wheel assemblies 30 that are disposed proximate the front 36 of the vehicle 10 may be arranged as steerable wheels and a pair of wheel assemblies of the one or more wheel assemblies 30 that are disposed proximate the rear 38 of the vehicle 10 may be arranged as drive wheels. In at least one embodiment, a pair of the one or more wheel assemblies 30 that are disposed proximate the front 36 of the vehicle 10 may be arranged as both drive wheels and steerable wheels. In at least one embodiment, a pair of the one or more wheel assemblies 30 that are disposed proximate the rear 38 of the vehicle 10 may be arranged as drive wheels and/or steerable wheels.

The powertrain 20 may include a propulsive source 40 and a transmission 42. The propulsive source 40 may be an internal combustion engine, electric motor, or a combination thereof that is arranged to provide power or propulsive torque that may be used to rotate one or more wheel assemblies 30 to propel the vehicle 10 via the transmission 42 and a drive shaft 44. The transmission 42 may be coupled to or may be driven by the propulsive source 40. The transmission 42 is drivably connected to an axle assembly 46 via the drive shaft 44.

The axle assembly 46 rotatably supports one or more wheel assemblies 30. The axle assembly 46 may be configured as a drive axle that may provide torque to rotate an associated wheel assembly 30 to propel the vehicle 10. An output of the transmission 42 is connected to an input of the axle assembly 46 with the drive shaft 44.

The suspension system 22 connects each wheel 34 of the one or more wheel assemblies 30 to a frame or chassis (not shown) of the vehicle 10. The suspension system 22 is arranged to dampen vibrations or oscillations, control wheel movement, and/or control axle assembly movement. The suspension system 22 is also arranged to provide a predetermined level of ride quality, control ride height or the distance between the frame or chassis and a support surface that the wheel assemblies 30 may engage, and/or affect handling and ride feel of the vehicle 10.

The suspension system 22 may include an anti-roll bar and a jounce bumper (not shown). The anti-roll bar may be commonly referred to as a sway bar or a stabilizer bar. The anti-roll bar connects opposite wheels of the vehicle 10 together. The anti-roll bar provides a force or reactionary force to reduce body roll of the vehicle 10. The jounce bumper or bump stop is provided to prevent the bottoming out of the suspension system 22 while under compression. The jounce bumper provides a resistive force as the suspension system 22 compresses.

The suspension system 22 is configured as an air suspension system that employs a plurality of air spring assemblies 50 that are each disposed proximate a corner of the vehicle 10. The suspension system 22 includes the plurality of air spring assemblies 50, a pressurized gas source 52, a valve block 54, and a controller 56.

Mounts are provided to attach each air spring assembly of the plurality of air spring assemblies 50 to an axle assembly and the frame or chassis of the vehicle 10. The plurality of air spring assemblies 50 may be employed in conjunction with a shock absorber (not shown) that is configured to dampen shock or impulses and dissipate kinetic energy. The shock absorber may be associated with each wheel assembly of the one or more wheel assemblies 30 and may extend between the wheel assembly and the frame or chassis.

The plurality of air spring assemblies 50 may each be provided with an air spring 60, a pressure sensor 62, and a suspension position sensor 64.

The air spring 60 is arranged to absorb shock and vibrations, affect ride quality, and at least partially set a ride height of the vehicle 10. Each air spring 60 is disposed proximate a corner of the vehicle 10 and supports the frame or chassis of the vehicle 10. It is also contemplated that a different number of air springs or air spring configurations may also be provided.

The air spring 60 is fluidly connected to the pressurized gas source 52 via a port that is connected to the valve block 54. An air mass of an air spring 60 of the plurality of air spring assemblies 50 may be varied by the pressurized gas source 52. The air spring 60 may be inflated or deflated to control the ride quality, to control cornering forces, and to control ride height.

The pressure sensor 62 and the suspension position sensor 64 may be provided as part of a sensor module 70 that is associated with each air spring assembly of the plurality of air spring assemblies 50. In at least one embodiment, the pressure sensor 62 may be completely spaced apart from the air spring 60 and is disposed in the valve block 54. Communication between the controller 56 and the sensor module 70 is represented by connection nodes M1-M4 in FIG. 1. For example, communication between the sensor module 70 associated with the air spring 60 that is associated with the right front wheel assembly is represented by the connection node M1. Communication between the sensor module 70 associated with the air spring 60 that is associated with the left front wheel assembly is represented by the connection node M2. Communication between the sensor module 70 associated with the air spring 60 that is associated with the left rear wheel assembly is represented by the connection node M3. Communication between the sensor module 70 associated with the air spring 60 that is associated with the right rear wheel assembly is represented by the connection node M4.

The pressure sensors 62 are positioned to monitor or measure a pressure of the air springs 60. The pressure sensors 62 are disposed proximate the air springs 60 and are separate from a pressure sensor that is provided with the valve block 54 that monitors a valve block delivery pressure. The pressure sensors 62 provide data or a signal indicative of the pressure of the air springs 60 to the controller 56.

The suspension position sensors 64 are positioned to monitor a total length of each air spring 60. The suspension position sensors 64 provide data or a signal indicative of the total length of the air springs 60 to the controller 56. The total length of the air spring 60 may correlate to a ride height of the vehicle 10. The ride height of the vehicle 10 may decrease as a wheel assembly moves closer to the frame or chassis of the vehicle 10 and the ride height of the vehicle 10 may increase as a wheel assembly moves further from the frame or chassis of the vehicle 10. As an air mass of the air springs 60 is varied, the total length of the air springs 60 may also vary to adjust the ride height as well as the corner force associated with the air spring 60. In at least one embodiment, a spring velocity may be derived from the data or signal indicative of the total length of the air spring 60.

In at least one embodiment, an aerodynamic force sensor 80, an acceleration sensor 82, and/or a steering angle sensor 84 may be provided. The aerodynamic force sensor determines aerodynamic forces based on a velocity of the vehicle 10 and an aero map to provide data or a signal indicative of the aerodynamic downforce on the vehicle 10 to the controller 56. The acceleration sensor 82 monitors the vehicle acceleration or deceleration. The acceleration sensor 82 may be an accelerometer that is arranged to provide data or a signal indicative of vehicle acceleration to the controller 56. The steering angle sensor 84 monitors or measures a steering angle of the vehicle 10. The steering angle sensor 84 provides data or a signal indicative of steering angle to the controller 56.

The pressurized gas source 52 stores and supplies a volume of a gas to the valve block 54 and ultimately to each air spring 60 of the plurality of air spring assemblies 50. Pressurized gas source 52 includes a compressor 90, a reservoir 92, and a reservoir pressure sensor 94. The compressor 90 may be driven by the propulsive source 40, the transmission 42, or a separate power source.

The compressor 90 is arranged to provide the gas, under pressure, to the reservoir 92. The gas that is stored by the reservoir 92 may be at a pressure that is greater than or equal to a target air spring pressure. The reservoir pressure sensor 94 monitors a pressure of the gas that is stored within the reservoir 92. Communication between the reservoir pressure sensor 94 and the controller 56 is represented by the connection node RP.

The reservoir 92 of the pressurized gas source 52 supplies the pressurized gas to the valve block 54. The valve block 54 is arranged to provide the pressurized gas to one or more of the air springs 60 of the plurality of air spring assemblies 50 through conduits 100. The conduit 100 may be a pipe, a tube, or a hose. The valve block 54 includes an inlet valve 102, an outlet valve 104, an exhaust valve 106, a manifold 108, and a valve block pressure sensor 110. The manifold 108 extends between the inlet valve 102, the outlet valve 104, and the exhaust valve 106 and distributes the pressurized gas to the multiple conduits 100.

The inlet valve 102 is arranged to facilitate or inhibit the flow of the pressurized gas from the reservoir 92 to the outlet valve 104. The inlet valve 102 includes, or may be controlled by, an actuator such as a solenoid (not shown) that may actuate the inlet valve 102 between an open position and a closed position. The pressurized gas is enabled to flow from the reservoir 92 of the pressurized gas source 52 while the inlet valve 102 is in the open position. The pressurized gas is inhibited from flowing from the reservoir 92 of pressurized gas source 52 while the inlet valve 102 is in the closed position.

The outlet valve 104 is arranged to facilitate or inhibit the flow of the pressurized gas from the manifold 108 of the valve block 54 to at least one air spring 60 of the plurality of air spring assemblies 50. Each outlet valve 104 is associated with a different conduit and a different air spring of the plurality of air spring assemblies 50. Each outlet valve 104 is actuated independently of the inlet valve 102, the exhaust valve 106, and each other, to independently control the inflation, deflation, or pressure assessment of different air springs of the plurality of air spring assemblies 50.

The outlet valve 104 includes or may be controlled by an actuator such as a solenoid that may actuate the outlet valve 104 between an open position and a closed position. The pressurized gas is enabled to flow from the manifold 108 through the outlet valve 104 and to an air spring 60 while the outlet valve 104 is in the open position. The pressurized gas is inhibited from flowing from the manifold 108 through the outlet valve 104 and to an air spring 60 while the outlet valve 104 is in the closed position.

The exhaust valve 106 is arranged to exhaust the pressurized gas to the atmosphere responsive to signals provided by the controller 56.

The valve block pressure sensor 110 monitors or measures the fluid pressure within the manifold 108. The valve block pressure sensor 110 is arranged to provide data or a signal indicative of a manifold pressure. Communication between the valve block pressure sensor 110 and the controller 56 is represented by the connection node VP.

The controller 56 monitors and controls operation of the suspension system 22. The controller 56 is configured to control actuation of the inlet valve 102, the outlet valves 104, the exhaust valve 106, and a variable volume valve provided with each air spring 60 of the plurality of air spring assemblies 50 that controls a total volume of each air spring 60 of the plurality of air spring assemblies 50. The controller 56 is in communication with each air spring 60 of the plurality of air spring assemblies 50 and is also in communication with each pressure sensor 62, each suspension position sensor 64, the reservoir pressure sensor 94, and the valve block pressure sensor 110. The controller 56 may vary an air mass of each air spring 60 of the plurality of air spring assemblies 50 to control a ride height and/or a cross weight of the vehicle 10.

The controller 56 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 56 in controlling the suspension system 22.

The controller 56 is arranged to monitor for variations in characteristics of each air spring 60 of the plurality of air spring assemblies 50 for a given suspension system mode of operation. The controller 56 is arranged to vary an air spring mass of each air spring 60 of the plurality of air spring assemblies 50, individually, to compensate for variations that may be caused by thermal changes, dynamic effects, or weight changes of the vehicle 10.

Each air spring 60 of the plurality of air spring assemblies 50 may have a predetermined plurality of air spring characteristics that are stored into memory of the controller 56. The predetermined plurality of air spring characteristics may be a spring pressure versus displacement curve or a spring pressure versus displacement lookup table that may be used for ride height control or vehicle cross control for a given suspension system mode of operation. As the temperature of an air spring 60 changes, the total length of each air spring 60 of the plurality of air spring assemblies 50 may change.

The controller 56 is programmed to determine a target spring pressure, or a base spring pressure, of each air spring 60 of the plurality of air spring assemblies 50. The target spring pressure or base spring pressure may correlate to a spring pressure when the vehicle 10 is on flat or even ground. A base anti-roll bar force for each corner is calculated using a predetermined anti-roll bar force map that is indexed by the base total spring length of all of the corners of the vehicle 10 that are connected to the anti-roll bar. A base jounce bumper force is calculated using a predetermined jounce bumper force vs displacement curve characteristic curve, where jounce bumper displacement is determined using the base total spring length. The base spring force is determined from the base corner force by factoring the anti-roll bar force, jounce bumper force, and suspension bushing forces. The base spring pressure is calculated using the base spring force and an effective area of each air spring 60 of the plurality of air spring assemblies 50 that is based on a total length based on the base total spring length. The effective area of each air spring 60 is based on an air spring volume and an air spring total spring length.

The controller 56 is programmed to perform ride height control to maintain a target vehicle ride height. A base spring total length vs. spring pressure curve is selected by the controller 56 from at least one predetermined spring total length vs. spring pressure curve. A spring total length vs. spring pressure curve is selected based on the base spring total length and the base spring pressure.

The controller 56 determines an estimated total length of each air spring 60 of the plurality of air spring assemblies 50 based on the predetermined plurality of air spring characteristics and the measured pressure of each air spring 60 of the plurality of air spring assemblies 50 provided by the pressure sensors 62. The difference between the estimated total length and the measured total length of each air spring 60 of the plurality of air spring assemblies 50 is the spring displacement of each air spring 60 of the plurality of air spring assemblies 50. The controller 56 determines an average difference between the estimated total length of each air spring 60 of the plurality of air spring assemblies 50 and a measured total length of each air spring of the plurality of air spring assemblies 50 provided by the suspension position sensors 64.

The controller 56 compares the average difference between the estimated total length and the measured total length of each air spring 60 of the plurality of air spring assemblies 50 to a threshold average difference. The average difference between the estimated total length and the measured total length of each air spring 60 of the plurality of air spring assemblies 50 may be considered a spring length error and the threshold average difference may be considered a spring length error threshold. Responsive to the average difference (spring length error) being greater than the threshold average difference (spring length error threshold), the controller 56 may operate the pressurized gas source 52 and/or the valve block 54 to vary an air mass of at least one air spring 60 of the plurality of air spring assemblies 50 until the average difference (spring length error) between the estimated total length and the measured total length of each air spring 60 of the plurality of air spring assemblies 50 is within the threshold average difference (spring length error threshold).

The controller 56 may prioritize the adjustment of an air mass of at least one air spring 60 of the plurality of air spring assemblies 50 such that the air spring 60 of the plurality of air spring assemblies 50 that has the largest average difference (largest spring length error) has the highest priority and the air spring 60 of the plurality of air spring assemblies 50 that has the smallest average difference (smallest spring length error) has the lowest priority. The controller 56 may then adjust the air mass of the air spring 60 of the plurality of air spring assemblies 50 having the highest priority prior to adjusting the air mass of the air spring 60 of the plurality of air spring assemblies 50 having the lowest priority until all of the spring length errors are under the spring length error threshold.

The dynamic and aerodynamic force data that may be provided by at least one of the aerodynamic force sensor 80, the acceleration sensor 82, and/or the steering angle sensor 84 may be used by the controller 56 to help adjust an air mass of at least one air spring 60 of the plurality of air spring assemblies 50. The controller 56, in addition to ride height adjustment or in place of ride height adjustment, may prioritize adjustment of an air spring 60 of the plurality of air spring assemblies 50 that may provide greatest effect on vehicle aerodynamics. For example, the controller 56 may prioritize adjusting or varying an air mass of air springs that are associated with the front 36 of the vehicle 10 prior to adjusting or varying an air mass of air springs associated with the rear 38 of the vehicle. The controller 56 may assign a higher priority to keeping the front 36 of the vehicle 10 level and at a desired ride height and the controller 56 may assign a lower priority to keeping the rear 38 of the vehicle 10 level and at a desired ride height.

The controller 56 is programmed to perform cross weight control to maintain or achieve a target vehicle cross percentage. The vehicle cross percentage expresses the weight distribution of the vehicle 10 that is based on the corner force of the right front corner plus the corner force of the left rear corner divided by the sum of the corner forces.

The controller 56 is programmed to perform air spring mass adjustments in response to changes in vehicle weight or changes in cross weight. As the vehicle weight increases, the spring travel may decrease and the spring pressure may increase such that the vehicle handling and performance may be affected. Responsive to an estimated total length of at least one air spring 60 of the plurality of air spring assemblies 50 being different from a target total length of the at least one air spring 60 based on the selected mode of the suspension system 22, the controller 56 receives a measured pressure and a measured total length of each air spring 60 of the plurality of air spring assemblies 50 from the pressure sensor 62 and the suspension position sensor 64.

The controller 56 determines corner forces associated with each air spring 60 at each corner of the vehicle 10 (e.g. right front corner, left front corner, right rear corner, and left rear corner) based on the pressure and the total length (effective area) of each air spring 60. The dynamic and aerodynamic forces that may be provided by, or estimated through, data provided by at least one of the aerodynamic force sensor 80, the acceleration sensor 82, and/or the steering angle sensor 84 to the controller 56 may be used by the controller 56 to determine the corner forces.

The corner forces may also be affected by a jounce bumper force and an anti-roll bar force. The jounce bumper force may be calculated for each corner of the vehicle 10 using a predetermined jounce bumper force vs. displacement characteristic curve. The jounce bumper displacement may be determined or measured using the suspension position sensor 64. The anti-roll bar force may be calculated for each corner of the vehicle 10 using a predetermined anti-roll bar force map that is indexed by the total spring length of each corner of the vehicle 10 that is connected to the anti-roll bar. The total spring lengths may be determined or measured using the suspension position sensor 64. A spring force may be determined from a base corner force by factoring the jounce bumper force and the anti-roll bar force. As such, each corner force may be a sum of the air spring force, the jounce bumper force, and the anti-roll bar force for each corner of the vehicle 10.

The controller 56, using the corner forces, determines the vehicle cross percentage.

The controller 56 may estimate the total vehicle weight based on a sum of all of the corner forces. The estimated total vehicle weight may be an average of at least one sample and may be filtered (confidence factor) using at least one of the suspension position sensor 64 and an accelerometer.

A target corner weight is calculated by the controller 56 for each corner of the vehicle 10 using a predetermined or a selected vehicle target front weight distribution and a predetermined or a selected vehicle cross weight. The target front weight distribution and the target vehicle cross weight correlate to a front weight distribution and vehicle cross weight if the vehicle 10 were on level ground.

Based on a target vehicle cross percentage or a predetermined vehicle cross percentage, the controller 56 may determine an average difference between an estimated vehicle cross percentage and the predetermined vehicle cross percentage.

The average difference between an estimated vehicle cross percentage and the predetermined vehicle cross percentage may be considered a vehicle cross error. The average difference (vehicle cross error) may be compared to a threshold difference. The threshold difference may be considered a vehicle cross error threshold. Responsive to the average difference (vehicle cross error) being greater than the threshold difference (vehicle cross error threshold), the controller 56 may determine a target spring pressure of an air spring 60 of the plurality air spring assemblies 50 to meet the target or predetermined vehicle cross percentage.

The controller 56 may also determine an estimated total length of each air spring 60 of the plurality of air spring assemblies 50 based on a measured air spring pressure and an air spring characteristic. Responsive to an average difference between the measured total length of at least one air spring 60 of the plurality of air spring assemblies 50 and the estimated total length of at least one air spring 60 of the plurality air spring assemblies 50 being greater than a threshold difference, the controller 56 may vary an air spring mass of at least one air spring 60 of the plurality of air spring assemblies 50.

The controller 56 may prioritize the adjustment of an air mass of an individual air spring 60 of the plurality of air spring assemblies 50 with the largest spring length error where the adjustment needed to reduce vehicle cross error will also reduce the spring length error spring has the highest priority and the air spring 60 that with the smallest spring length error has the lowest priority. If an adjustment to the air mass is unable to reduce the vehicle cross error and also reduce the spring length error for that spring, the highest priority may be assigned to the spring having the smallest spring length error. The controller 56 may then adjust the air mass of the air springs having the highest priority prior to adjusting the air mass of the air springs having the lowest priority until the vehicle cross error is within the vehicle cross error threshold. This prioritization strategy provides a balance between ride height and vehicle cross percentage to reduce the chance that a vehicle cross adjustment may cause the ride height to be out of tolerance.

Figure 2:
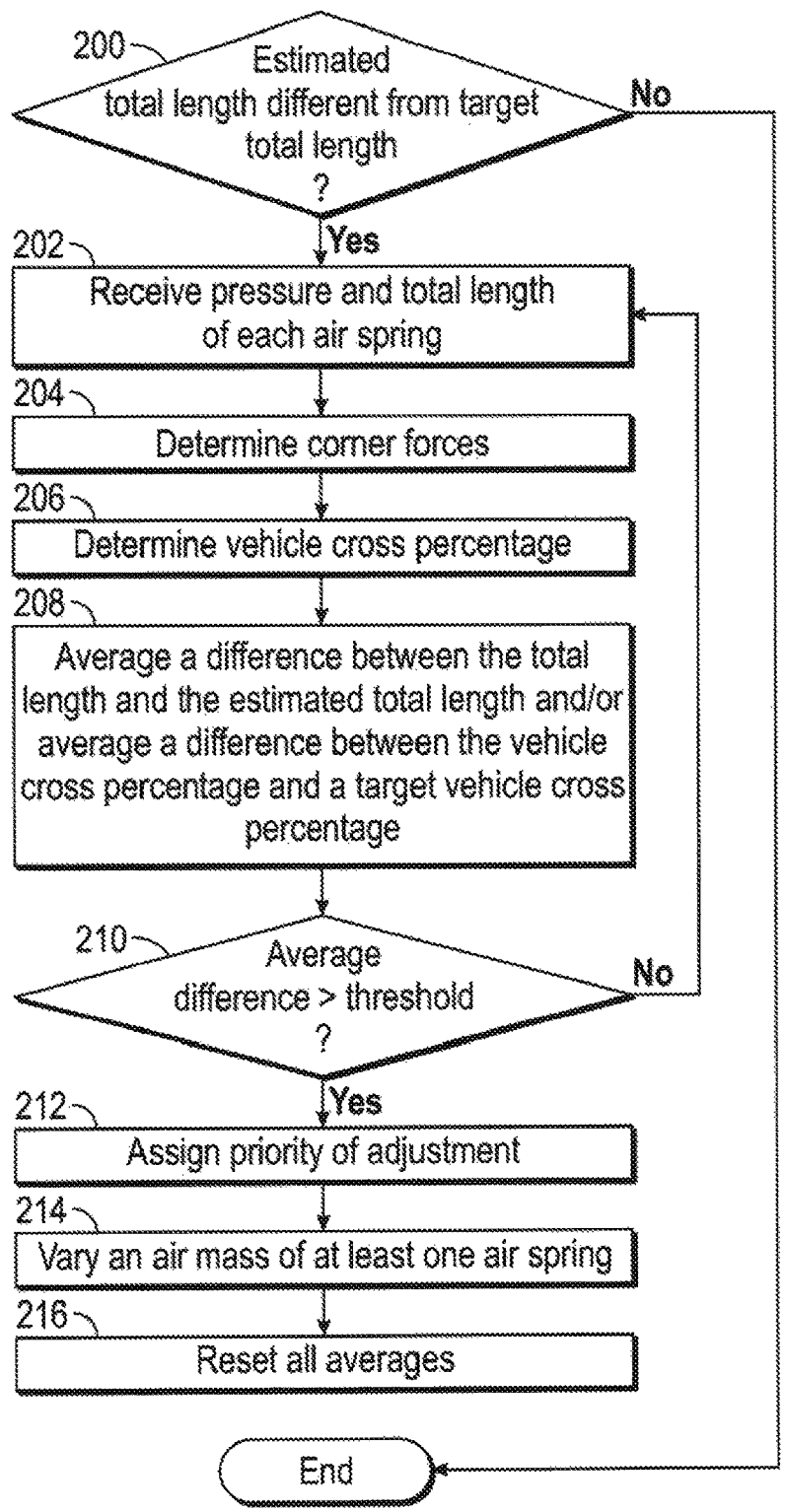
FIG. 2 is a flowchart of a method of controlling the suspension system.

Referring to FIG. 2, a flowchart of an illustrative method of control of the suspension system 22 is shown. The flowchart represents control logic that may be implemented or affected in hardware, software, or a combination of hardware and software that may be executed by the controller 56. For brevity, the method will be described in the context of a single method iteration below.

At block 200, the method assesses whether the estimated total length of at least one air spring 60 is different from the target total length of at least one other air spring 60 of the plurality of air spring assemblies 50. Should the estimated total length of the at least one air spring 60 not be different from the target total length of the at least one other air spring 60 of the plurality of air spring assemblies 50, the method may end. If the estimated total length of the at least one air spring 60 be different from the target total length of the at least one other air spring 60 of the plurality of air spring assemblies 50, the method may continue to block 202.

At block 202, the method receives a measured pressure and total length of each air spring 60.

At block 204, the method determines corner forces associated with each air spring 60.

At block 206, the method determines a vehicle cross percentage based on the corner forces.

At block 208, the method averages a difference between the total length and the estimated total length and/or the method averages a difference between the vehicle cross percentage and a target vehicle cross percentage.

At block 210, the method compares an average difference between the total length and the estimated total length of the at least one air spring 60 to a total length threshold and/or the method compares an average difference between the vehicle cross percentage and a target vehicle cross percentage to a vehicle cross percentage threshold.

Should the average difference between the total length and the estimated total length of the at least one air spring 60 be less than the total length threshold and/or the average difference between the vehicle cross percentage and a target vehicle cross percentage be less than the vehicle cross percentage threshold, the method may return to block 202 or end. If the average difference between the total length and the estimated total length of the at least one air spring 60 be greater than the total length threshold and/or the average difference between the vehicle cross percentage and a target vehicle cross percentage is greater than the vehicle cross percentage threshold, the method continues to block 212.

At block 212, the method determines or assigns priority of adjustment of an air mass to at least one air spring 60 of the plurality of air spring assemblies 50. The air spring 60 having the largest average difference (largest spring length error) may have the highest priority and the air spring 60 having the smallest average difference (smallest spring length error) may have the lowest priority. The air spring 60 with the largest spring length error and with the largest vehicle cross error may have the highest priority and the air spring 60 that has the smallest spring length error and with the smallest spring length error may have the lowest priority.

At block 214, the method varies or adjusts an air mass of at least one air spring 60 of the plurality of air spring assemblies 50 according to the assigned priority of adjustment determined at block 212. For example, the method may adjust the air mass of the air spring 60 having the highest priority prior to adjusting the air mass of the air spring 60 having the lowest priority until all of the errors are under their respective error thresholds.

At block 216, the method resets all of the averages differences after an adjustment is made to at least one air spring 60. For example, the average difference (spring length error) and the average difference (vehicle cross error) may be reset by the method because the adjustment of one air spring 60 of the plurality of air spring assemblies 50 may impact all of the other air springs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A suspension system, comprising:
    a plurality of air spring assemblies, each air spring assembly comprising:
        an air spring;
        a pressure sensor to monitor a pressure of the air spring, and
        a suspension position sensor to monitor a total length of the air spring; and
    a controller in communication with each air spring assembly, the controller being programmed to determine an estimated total length of the air spring based on the pressure of the air spring and a plurality of air spring characteristics, wherein the controller is further programmed to vary an air mass of at least one air spring of the plurality of air spring assemblies, in response to an average difference between the total length of the air spring and the estimated total length of the air spring being greater than a threshold.

2. The suspension system of claim 1, wherein the controller is further programmed to receive the pressure of the air spring from the pressure sensor, in response to the estimated total length being different from a target total length of the air spring.

3. The suspension system of claim 2, wherein the controller is further programmed to determine corner forces associated with each air spring of the plurality of air spring assemblies based on the pressure and an effective area of the air spring.

4. The suspension system of claim 3, wherein the corner forces associated with each of the plurality of air spring assemblies is further based on at least one of a steering angle, an aerodynamic force, and a vehicle acceleration.

5. The suspension system of claim 3, wherein the controller is further programmed to determine a vehicle cross percentage based on the corner forces.

6. The suspension system of claim 5, wherein the controller is further programmed to vary the air mass of at least one air spring of the plurality of air spring assemblies, in response to an average difference between the vehicle cross percentage and a predetermined vehicle cross percentage being greater than a vehicle cross percentage threshold.

7. A suspension system for a vehicle, comprising:
    a plurality of air spring assemblies, each having an air spring, and a suspension position sensor; and
    a controller being programmed to, determine corner forces associated with each air spring of the plurality of air spring assemblies based on a pressure provided by a pressure sensor and an effective area of each air spring of the plurality of air spring assemblies based on a total length provided by the suspension position sensor, according to a target total length of each air spring.

8. The suspension system of claim 7, wherein the controller is further programmed to determine a total vehicle weight and to determine a vehicle cross percentage based on the corner forces of each air spring of the plurality of air spring assemblies.

9. The suspension system of claim 8, wherein the controller is further programmed to determine a target corner force associated with each air spring of the plurality of air spring assemblies according to the target total length, based on the vehicle weight and the vehicle cross percentage.

10. The suspension system of claim 9, wherein the controller is further programmed to, in response to an average difference between the vehicle cross percentage and a predetermined vehicle cross percentage according to the target total length of each air spring being greater than a threshold, determine an estimated total length of each air spring of the plurality of air spring assemblies.

11. The suspension system of claim 10, wherein the controller is further programmed to in response to an estimated total length of at least one air spring being different from a target total length of the at least one air spring, receive a pressure and the total length of each air spring of the plurality of air spring assemblies.

12. The suspension system of claim 11, wherein the estimated total length of each air spring of the plurality of air spring assemblies is based on the pressure and a predetermined air spring characteristic of each air spring.

13. The suspension system of claim 11, wherein the controller is further programmed to in response on an average difference between the total length of at least one air spring of the plurality of air spring assemblies and the estimated total length of at least one air spring of the plurality of air spring assemblies being greater than a total length threshold, vary an air mass of at least one air spring of the plurality of air spring assemblies.

14. A method of controlling a suspension system, comprising:
    receiving a pressure and a total length of each air spring of a plurality of air spring assemblies, in response to an estimated total length of at least one air spring being different from a target total length of at least one air spring; and determining corner forces associated with each air spring of the plurality of air spring assemblies based on the pressure and an effective area of each air spring of the plurality of air spring assemblies.

15. The method of claim 14, wherein the estimated total length is based on the pressure and a plurality of air spring characteristics of each air spring.

16. The method of claim 14, further comprising:
determining a vehicle cross percentage based on the corner forces of each air spring of the plurality of air spring assemblies.

17. The method of claim 16, wherein the vehicle cross percentage is further based on at least one of an aerodynamic force, a vehicle acceleration, and a steering angle.

18. The method of claim 17, further comprising:
assigning a priority of adjustment to at least one air spring of the plurality of air spring assemblies.

19. The method of claim 18, further comprising:
varying an air mass of at least one air spring of the plurality of air spring assemblies according to the assigned priority of adjustment.

* * * * *